(12) United States Patent
Kato et al.

(10) Patent No.: US 7,887,741 B2
(45) Date of Patent: Feb. 15, 2011

(54) METHOD FOR PRODUCING PLASTIC PRODUCTS HAVING GRAINED SURFACE THEREON

(75) Inventors: Tomohisa Kato, Aichi-ken (JP); Takashi Okano, Aichi-ken (JP)

(73) Assignee: Sakaeriken Kogyo Co., Ltd., Aichi-Ken (JP)

( * ) Notice: Subject to any disclaimer, the term of this patent is extended or adjusted under 35 U.S.C. 154(b) by 130 days.

(21) Appl. No.: 10/267,935

(22) Filed: Oct. 9, 2002

(65) Prior Publication Data

US 2003/0067100 A1    Apr. 10, 2003

(30) Foreign Application Priority Data

| Oct. 10, 2001 | (JP) | ............................. 2001-312307 |
| Oct. 18, 2001 | (JP) | ............................. 2001-320147 |
| Feb. 8, 2002  | (JP) | ............................. 2002-031939 |

(51) Int. Cl.
*B29C 45/14* (2006.01)
*B29C 51/10* (2006.01)

(52) U.S. Cl. ....................... 264/509; 264/511; 264/513; 264/550; 264/255; 264/293; 264/266

(58) Field of Classification Search ................. 264/511, 264/513, 509, 550, 255, 266
See application file for complete search history.

(56) References Cited

U.S. PATENT DOCUMENTS

| 2,910,728 | A | * | 11/1959 | Rowe, Jr. ..................... 425/388 |
| 3,512,335 | A | * | 5/1970  | Rorer .......................... 53/509 |
| 3,737,494 | A | * | 6/1973  | Wolf ........................... 264/549 |
| 3,739,052 | A | * | 6/1973  | Ayres .......................... 264/512 |
| 3,954,374 | A | * | 5/1976  | Wommelsdorf et al. ..... 425/388 |
| 4,239,727 | A | * | 12/1980 | Myers et al. ................. 264/550 |
| 4,352,776 | A | * | 10/1982 | Weisner et al. .............. 264/522 |
| 4,714,424 | A | * | 12/1987 | Kinugasa et al. ............ 425/388 |
| 4,789,129 | A | * | 12/1988 | Sisto ........................... 249/102 |
| 4,917,903 | A | * | 4/1990  | Mente ...................... 425/174.4 |
| 4,997,707 | A | * | 3/1991  | Otawa et al. ............. 428/319.3 |
| 5,096,652 | A | * | 3/1992  | Uchiyama et al. ........... 264/511 |
| 5,188,787 | A | * | 2/1993  | King et al. ................... 264/153 |
| 5,529,472 | A | * | 6/1996  | Jenkins ........................ 425/388 |
| 6,596,218 | B2 | * | 7/2003 | Klotz .......................... 264/511 |

* cited by examiner

*Primary Examiner*—Edmund H. Lee
(74) *Attorney, Agent, or Firm*—Osha Liang LLP

(57) ABSTRACT

A method includes heating a thermoplastic sheet to a predetermined temperature, and placing the heated sheet between a male die and a female die. The female die has a grain pattern on an inner surface thereof and a plurality of minute holes extending therethrough. The method further includes closing the male die and the female die to press the sheet against the inner surface of the female die, drawing the sheet to the female die by vacuum pressure through the plurality of minute holes, and thereby the grain pattern on the female die is transferred to the sheet. After that, thermoplastic molten plastic material is injected into a space between the laminate material and the male die, and is cooled down so that the plastic product is formed by integrating the sheet and the injected material.

10 Claims, 4 Drawing Sheets

METHOD FOR PRODUCING PLASTIC PRODUCTS HAVING GRAINED SURFACE THEREON

BACKGROUND OF INVENTION

1. Field of the Invention

The present invention relates to an injection molding apparatus for producing plastic products having grain patterns thereon.

2. Background Art

Conventionally, plastic products having grained surfaces have been produced by preparing a laminate material with a grain pattern on its surface in advance, and then the laminate material is adhered using an adhesive or the like to the surface of the plastic product. However, when there are three-dimensional curved surfaces or the like on the products, this method has a problem in that the laminate material is stretched unnecessarily or that wrinkles occur around the curved surfaces. There is also a problem in that there is stretching or sagging in the grain pattern itself.

In order to solve these problems, a method for producing a plastic product having a grained surface has been proposed. According to this method, a grain pattern is formed in advance in one die, and a laminate material for creating the grain pattern is placed in this die. Under this condition, a plastic product formed in a predetermined shape and coated with adhesive is pushed against the back surface of the laminate material such that the laminate material is caused to adhere to the product. Thereafter, the laminate material is pulled by a vacuum from the die having the grain pattern thereon. However, this grained pattern fabrication process has a problem in that it takes too long.

Under the above situation, what is needed is a method wherein grain patterns can be fabricated rapidly on the plastic product in a single unit, and an injection molding apparatus that can be used for that purpose.

SUMMARY OF INVENTION

In general, in one aspect, the present invention relates to a method for producing a plastic product having a grained surface. The method comprises heating a sheet shaped laminate material made of a thermoplastic resin to a predetermined temperature, placing the heated laminated material between a male die and a female die, the female die having a grain pattern on an inner surface thereof and a plurality of minute holes therethrough, closing the male die and the female die such that the heated laminate material is pressed against the inner surface of the female die by the male die, drawing the laminate material to the female die by a vacuum through the plurality of minute holes of the female die so that the grain pattern on the inner surface of the female die is transferred to the laminate material, injecting thermoplastic molten plastic material to a space between the laminate material and the male die, and cooling the injected thermoplastic molten plastic material so that the plastic product having a predetermined shape is formed between the male die and female die and the laminate material having the grain pattern is integrally laminated on the plastic product.

Other aspects and advantages of the invention will be apparent from the following description and the appended claims.

DETAILED DESCRIPTION

Figure 1:
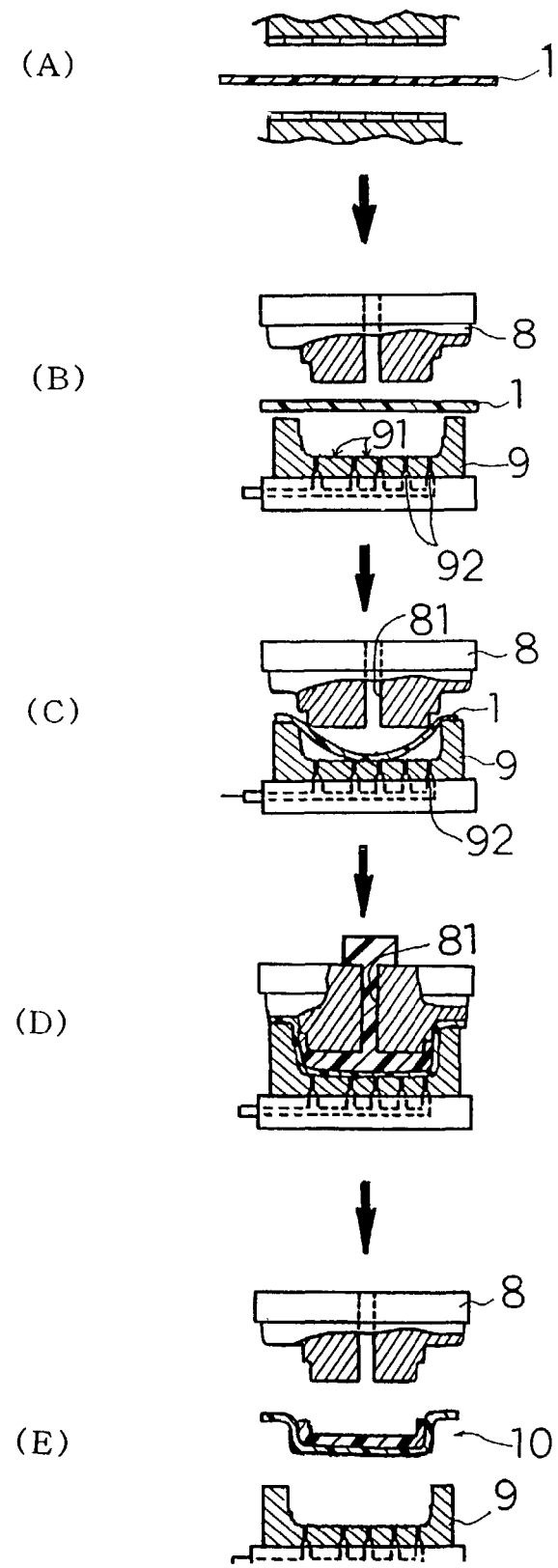
FIGS. 1 (A)-(E) show the process for producing a plastic product having a grained surface in accordance with the first embodiment of the present invention.
Figure 2:
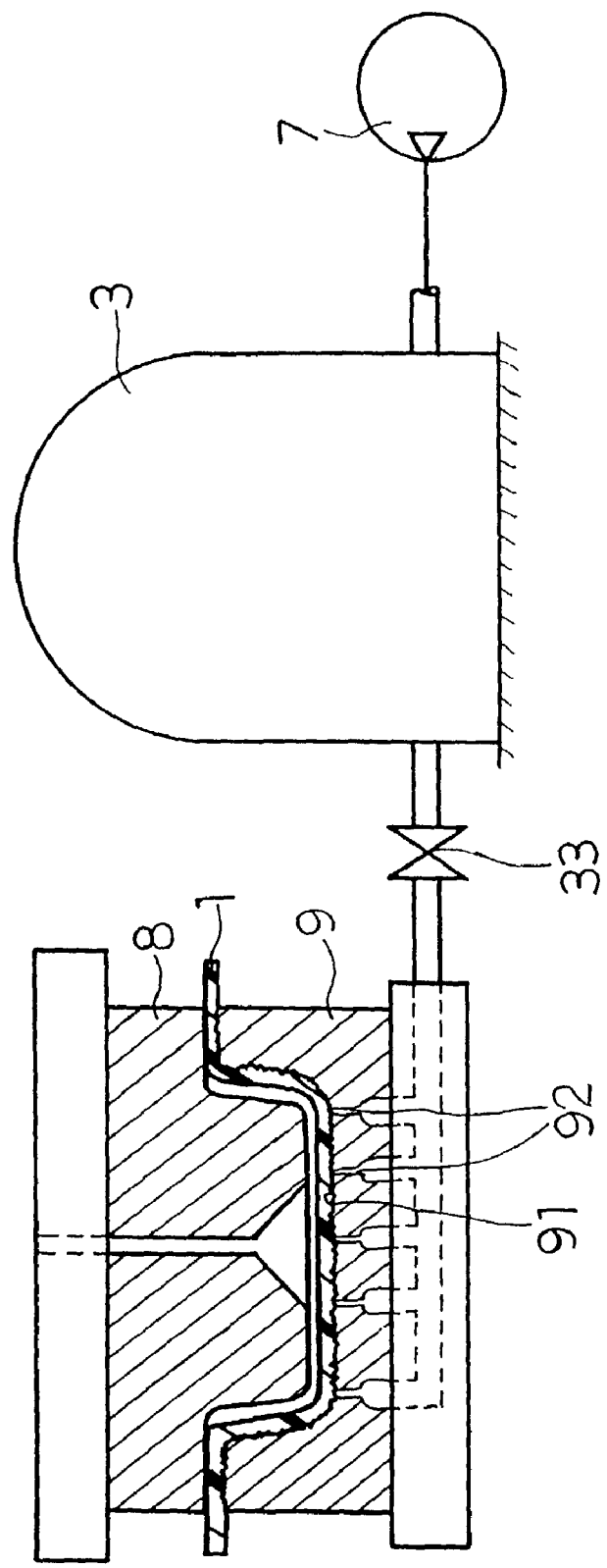
FIG. 2 is a schematic showing the vacuum supplying process according an embodiment of the present invention.

Referring now to the drawings, the present invention is explained in detail. FIGS. 1 and 2 will be referenced in explaining the first embodiment of the present invention.

The method in this first embodiment comprises a preheating process (A) for a heating a thermoplastic laminate material 1 to a predetermined temperature, laminate material placing process (B) for placing the heated laminate material 1 between the male die 8 and the female die 9, a grain pattern fabricating process (C) for closing dies 8 and 9 of the injection molding apparatus while having the laminate material 1 placed therebetween and drawing a vacuum from the female die through minute holes 92 of the female die 9 to transfer the grain pattern 91 provided on the inner surface of the female die 9 to the front surface of the laminate material 1, an injecting process (D) for injecting a thermoplastic molten plastic material through the injection aperture 81 of the male die 8 to the back surface of the laminate material 1, and a die opening process (E) for opening the dies 8 and 9 and taking the grain patterned plastic product 10 formed in a predetermined shape out of the injection molding apparatus.

In the above embodiment, an olefin elastomer (TPO), which can easily transfer the grain pattern, is preferably used for the laminate material 1.

Next, the process for fabricating the grain pattern onto the laminate material 1 will be explained in detail. First, in the preheating process (A) shown in FIG. 1 (A), the laminate material 1 is heated to have a surface temperature of about 140° C.-170° C. In the subsequent process (B), the laminate material 1 is placed between the female die 9 and the male die 8 as shown in FIG. 1 (B) such that the front surface of the laminate material 1 is facing the inner surface of the female die 9 having a grain pattern 91. At this time, the dies 8 and 9 are warmed to have a surface temperature of about 25° C.-50° C.

After closing the dies 8 and 9 in this state, the laminate material 1 is drawn to the inner surface of the female die 9 by a vacuum in the grain pattern fabrication process (C) as shown in FIG. 1 (C) through the innumerable minute holes 92 of the female die 9.

The above vacuum drawing process is performed as follows. As shown in FIG. 2, a predetermined vacuum level generated by running the vacuum pump 7 is stored in advance in a vacuum tank 3 with a predetermined capacity. After this, valve 33, shown in FIG. 2, is opened to deliver the predetermined vacuum level to the minute holes 92 for drawing a vacuum, delivering the predetermined amount of accumulated vacuum pressure. As a result, the laminate material 1 is drawn to the female die 9, transferring the grain pattern 91 provided on the female die 9 to the front surface of the laminate material 1. In this vacuum drawing process, the vacuum level used in this embodiment is between −680 mmHg to −760 mmHg vacuum level (vacuum pressure). The vacuum tank 3 has an enough capacity to draw a vacuum in the dies 8 and 9. In many cases, a capacity 12 to 15 times the capacity corresponding to the volume of the female die 9 is used. In this embodiment, a vacuum tank 3 with a 300 liter capacity is used.

Next, after the predetermined grain pattern is formed on the surface of the laminate material 1 by drawing a vacuum such that the laminate material 1 is adhered against the inner surface of the female die 9, a predetermined amount of thermoplastic molten plastic material is injected into the cavity space formed at the back surface of the laminate material 1, as shown in FIG. 1 (D). By doing this, a plastic product 10 having a grain pattern is fabricated efficiently through injection molding.

Figure 3:
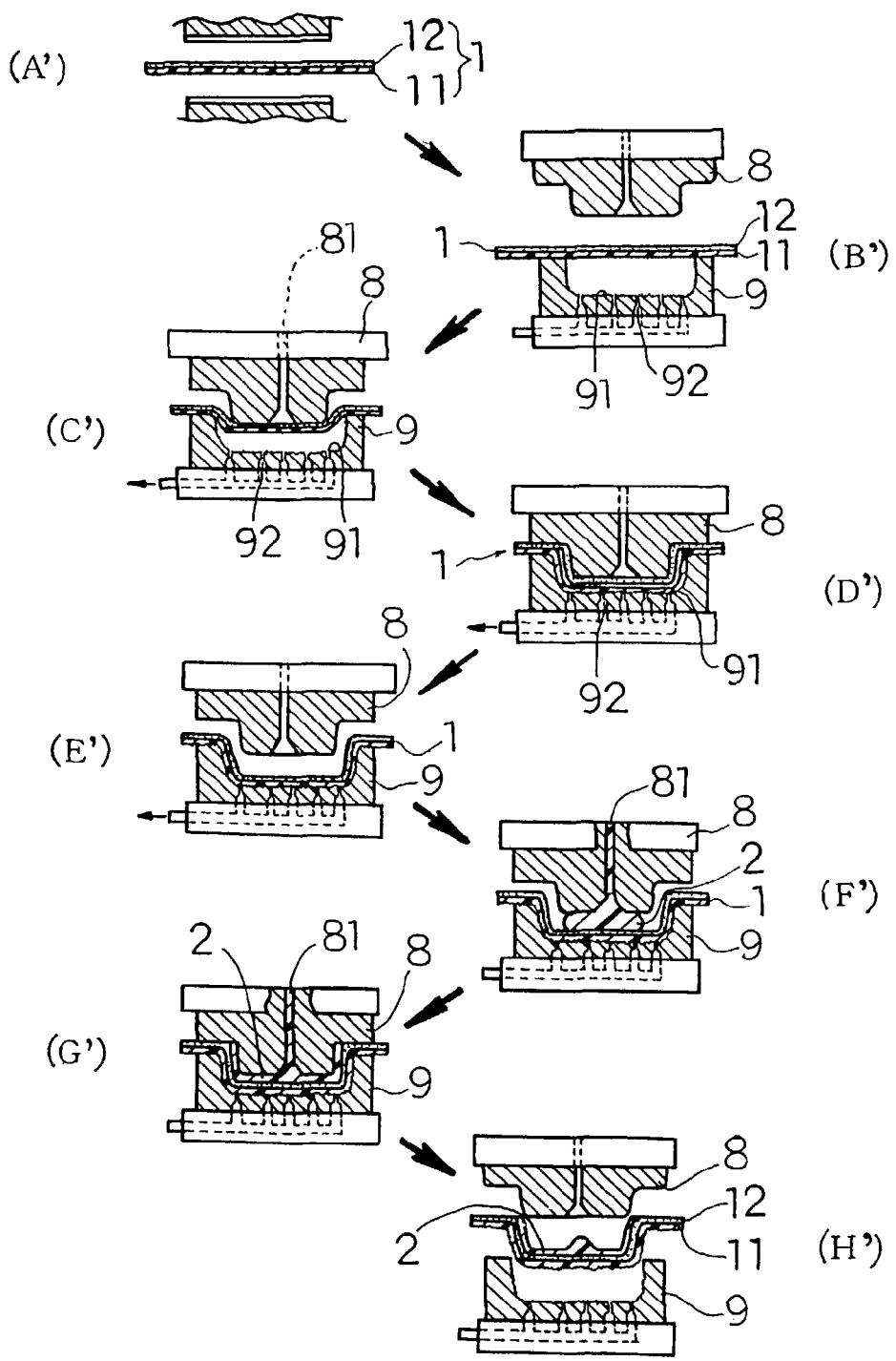
FIGS. 3 (A')-(H') show the process for producing a plastic product having a grained surface in accordance with the second embodiment of the present invention.

Next, a second embodiment of the present invention will be explained in detail by referring to FIG. 3 and FIG. 4. The second embodiment is basically the same as the first embodiment, with the exception that the configuration of the laminate material 1 is different and that the male die 8 is re-closed after the male die 8 is once closed and thereafter retreated. Namely, as shown in FIG. 3, the method in the present embodiment comprises a preheating process (A') for heating the laminate material 1 comprising a surface layer 11 and a foam layer 12 made from a foam plastic material to a predetermined temperature, closing process (C') for closing the injection molding apparatus in a state wherein the heated laminate material 1 is positioned such that the surface layer 11 is facing the inner surface of the female die 9 as shown in FIGS. 3 (B') and 3 (C'), a grain pattern fabrication process (D') for fabricating the grain pattern in the front layer 11 of the laminate material 1 by drawing a vacuum from the female die 9 while the injection molding apparatus is closed, injecting process (F') for forming a predetermined cavity space on the back surface side of the laminate material 1 by retreating the male die 8 from the back surface of the laminate material 1 and then injecting a thermoplastic molten material 2 into the cavity space at a low pressure, and a compression molding process (G') for re-closing the dies while advancing the male die 8 at a predetermined speed. After doing this, the dies 8 and 9 are opened as shown in FIG. 3 (H') and the plastic product formed in the predetermined shape is taken out.

In the above second embodiment, an olefin elastomer (TPO) is used as the material for fabricating the front surface layer 11 in the present embodiment. By using TPO, the grain pattern is transferred with relative ease. As the foam plastic layer (foam layer) 12 forming a foam body, polypropylene foam material (PP foam) is used. As an other possible alternative, olefin elastomer (TPO) can be used for the front surface layer 11 and inexpensive polyethylene foam can be used for the foam layer 12.

The process for forming the grain pattern on the front surface of the laminate material 1 is performed under essentially the same conditions as in the first embodiment, for example, under the same preheating temperature for the laminate material 1 and the same surface temperature of the dies, etc. Also, the structure of the female die 9, particularly in terms of the grain pattern 91 formed on the inner surface thereof or the minute holes 92 for drawing a vacuum, is essentially the same as that of the first embodiment.

The above described dies 8 and 9 are then closed in the following die closing process ((C') in FIG. 3), and then in the subsequent vacuum drawing process ((D') in FIG. 3), the laminate material 1 is drawn by a vacuum to the female die 9 through the innumerable minute holes 92. This vacuum draw down is performed using the same method in the second embodiment as in the first embodiment described above. Namely, as is shown in FIG. 2, the predetermined vacuum pressure generated by the operation of a vacuum pump 7 is accumulated in advance in a vacuum tank 3 that has a predetermined capacity. Subsequently, with a predetermined amount of vacuum pressure accumulated in the vacuum tank 3, the valve 33 shown in FIG. 2 is opened rapidly to supply all at once the predetermined vacuum pressure to the minute holes 92 for drawing a vacuum, described above. As a result, the laminate material 1 is drawn nearly instantaneously to the female die 9, transferring in a fresh state to the front surface layer 11 of the laminate material 1 the grain pattern 91 provided on the female die 9. The vacuum pressure used in this vacuum draw process is the same as in the first embodiment, described above.

Next, after this vacuum draw down process ((D') in FIG. 3) has been completed to form the grain pattern on the front surface 11, then, as is shown in (D') of FIG. 3, the male die 8 is retreated a predetermined distance to form a cavity of a predetermined size on the back side of the laminate material 1. After this, a predetermined amount of thermoplastic molten plastic material is injected to the cavity at a low pressure from the injection aperture 81 provided through the male die 8 as shown in (F') in FIG. 3.

In this state, the male die 8 is advanced at a predetermined speed to again press the dies as shown in (G') of FIG. 3. By doing this, the thermoplastic molten plastic material injected as described above is pressed between the dies 8 and 9. This press process is performed at the optimal speed. In other words, the male die 8 should be caused to advance gradually so as not to crush excessively the foam material layer 12 disposed on the back surface of the laminate material 1 in such a way that it loses its elasticity.

Figure 4:
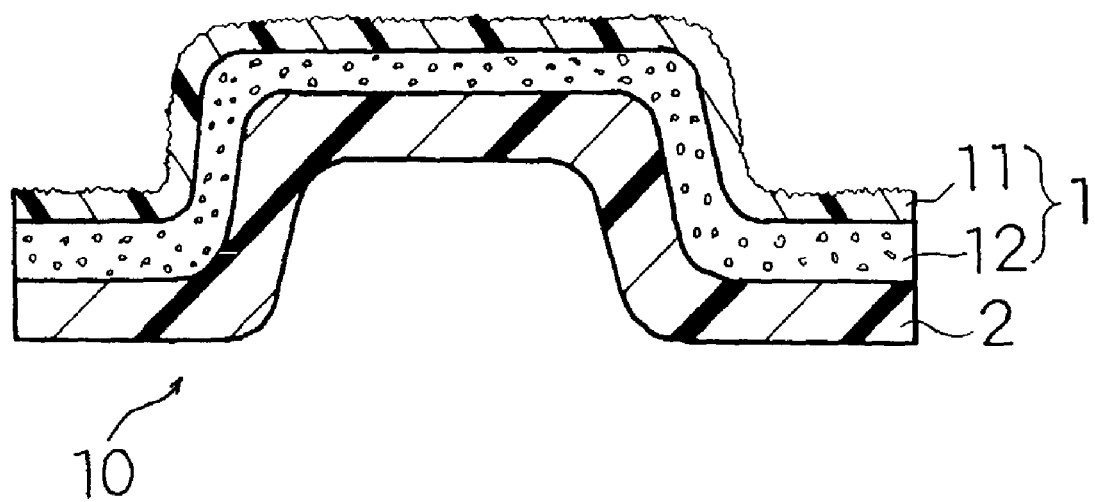
FIG. 4 is a cross-sectional view of the plastic product produced by using the second embodiment of the present invention.

The series of processes described above fabricate a plastic product that has a grain pattern on its surface, as shown in FIG. 4. The plastic product that is fabricated in this way is then taken out from the dies 9 and 8 in the subsequent die opening process, (See (H') in FIG. 3), thus completing the manufacturing process for the plastic product with a grain pattern.

In the second embodiment, the same metal dies 8 and 9 can be used to perform the fabrication process of the plastic product as a continuation of the formation of the grain pattern. This makes it possible to improve productivity. Furthermore, when it comes to fabricating the plastic product, because the predetermined shape is fabricated by moving the male die 8 after injecting a predetermined amount of thermoplastic plastic material into the cavity at a low pressure when fabricating the plastic, excessive compression of the foam layer 12 on the back surface of the laminate material 1 is prevented, making it possible to maintain a soft feel and maintain flexibility even in the corner parts and curved surfaces of the plastic product 10.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for producing a plastic product having a grained surface, comprising:
   heating a thermoplastic sheet to a first temperature;

placing the heated thermoplastic sheet between a first die and a second die having a grain pattern thereon, wherein the second die is provided with a plurality of minute holes extending therethrough and configured to be substantially uniformly distributed over an inner bottom surface thereof, and wherein the plurality of minute holes are connected to a vacuum tank through a passage controlled by a valve;

warming the first die and the second die to a second temperature substantially lower than the first temperature, wherein the warming is at least partially independent from the heat supplied by the heating of the thermoplastic sheet and the thermoplastic molten plastic material;

closing the first die and the second die such that the thermoplastic sheet is pushed by the first die toward the second die, and is deformed to conform to the first die and the second die;

opening the valve rapidly to supply a predetermined vacuum pressure in the vacuum tank to the plurality of the minute holes substantially uniformly and simultaneously, while the first die and the second die are closed, wherein the vacuum tank is pumped to the predetermined vacuum pressure in advance;

retreating the first die by a predetermined distance such that space is formed between the first die and the thermoplastic sheet;

injecting thermoplastic molten plastic material in between the thermoplastic sheet and the first die;

re-closing the first die and the second die; and cooling the injected thermoplastic molten plastic material such that the plastic product is formed by integrating thermoplastic sheet and the injected thermoplastic molten plastic material, wherein the second temperature is substantially lower than a surface temperature of the thermoplastic sheet.

2. A method for producing a plastic product having a grained surface, comprising:

heating a thermoplastic sheet to a first temperature;

placing the heated thermoplastic sheet between a first die and a second die having a grain pattern thereon, wherein the second die is provided with a plurality of minute holes extending therethrough, and wherein the plurality of minute holes are connected to a vacuum tank through a passage controlled by a valve;

warming the first die and the second die to a second temperature substantially lower than the first temperature, wherein the warming is at least partially independent from the heat supplied by the heating of the thermoplastic sheet and the thermoplastic molten plastic material;

closing the first die and the second die such that the thermoplastic sheet is pushed by the first die toward the second die, and is deformed to conform to the first die and the second die;

opening the valve rapidly to supply a predetermined vacuum pressure in the vacuum tank to the plurality of the minute holes substantially uniformly and simultaneously, while the first die and the second die are closed, wherein the predetermined vacuum pressure is produced in the vacuum tank in advance using a vacuum pump when the valve is closed;

retreating the first die for a predetermined distance such that a space is formed between the first die and the thermoplastic sheet;

injecting thermoplastic molten plastic material in between the thermoplastic sheet and the first die;

re-closing the first die and the second die; and cooling the injected thermoplastic molten plastic material such that the plastic product is formed by integrating thermoplastic sheet and the injected thermoplastic molten plastic material, wherein the second temperature is substantially lower than a surface temperature of the thermoplastic sheet.

3. The method according to claim 1, wherein the predetermine vacuum pressure is between −680 mmHg and −760 mmHg.

4. The method according to claim 1, wherein the vacuum tank has a predetermined capacity larger than the volume of the second die.

5. The method according to claim 4, wherein the predetermined capacity is between 12 and 15 times the capacity corresponding to the volume of the second die.

6. The method according to claim 1, wherein the thermoplastic sheet comprises an olefin elastomer (TPO) layer and a foam plastic layer.

7. The method according to claim 6, wherein the foam plastic layer is made of polypropylene foam material (PP foam).

8. The method according to claim 6, wherein the foam plastic layer is made of polyethylene foam.

9. The method according to claim 1, wherein the first temperature is between 140° C. and 170° C.

10. The method according to claim 1, wherein the second temperature is between 25° C. and 50° C.

* * * * *